US012769345B2

(12) United States Patent
Segawa

(10) Patent No.: US 12,769,345 B2
(45) Date of Patent: Oct. 20, 2026

(54) POWER SUPPLY CIRCUIT AND STARTING METHOD FOR POWER SUPPLY CIRCUIT

(71) Applicant: Tomoki Segawa, Tokyo (JP)

(72) Inventor: Tomoki Segawa, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 156 days.

(21) Appl. No.: 18/805,900

(22) Filed: Aug. 15, 2024

(65) Prior Publication Data

US 2025/0068199 A1 Feb. 27, 2025

(30) Foreign Application Priority Data

Aug. 22, 2023 (JP) ................................ 2023-134767

(51) Int. Cl.

| | |
|---|---|
| ***G05F 1/46*** | (2006.01) |
| ***G05F 1/575*** | (2006.01) |
| ***G05F 1/577*** | (2006.01) |
| ***G05F 3/26*** | (2006.01) |
| ***H02M 1/36*** | (2007.01) |

(52) U.S. Cl.

CPC ............. *G05F 1/468* (2013.01); *G05F 1/575* (2013.01); *G05F 1/577* (2013.01); *G05F 3/26* (2013.01); *H02M 1/36* (2013.01)

(58) Field of Classification Search

CPC .......... G05F 1/468; G05F 1/575; G05F 1/577; G05F 3/26; H02M 1/36

See application file for complete search history.

(56) References Cited

U.S. PATENT DOCUMENTS

2006/0239045 A1* 10/2006 Chen ...................... H02M 1/36 363/49

2022/0397925 A1* 12/2022 Tiruvamattur .......... G05F 3/262

FOREIGN PATENT DOCUMENTS

JP 2005-208968 8/2005

* cited by examiner

*Primary Examiner* — Jue Zhang

(74) *Attorney, Agent, or Firm* — IPUSA, PLLC

(57) ABSTRACT

A power supply circuit includes a reference voltage generation circuit configured to generate a reference voltage that is lower than an input voltage, a first regulator configured to generate a first power supply voltage that is higher than the reference voltage based on the input voltage and the reference voltage, a first starting circuit configured to control the reference voltage generation circuit such that the reference voltage rises after the input voltage rises, and a second starting circuit configured to control the first regulator such that the first power supply voltage rises after the reference voltage rises.

14 Claims, 12 Drawing Sheets

POWER SUPPLY CIRCUIT AND STARTING METHOD FOR POWER SUPPLY CIRCUIT

CROSS-REFERENCE TO RELATED APPLICATIONS

This application claims priority under 35 U.S.C. § 119 to Japanese Patent Application No. 2023-134767, filed Aug. 22, 2023, the contents of which are incorporated herein by reference.

BACKGROUND

1. Technical Field

The present disclosure relates to a power supply circuit and a starting method for the power supply circuit.

2. Description of the Related Art

In order to stably raise a reference voltage without overshoot, a power supply regulator including a starting circuit for activating a reference voltage generation circuit has been known (see Patent Document 1).

RELATED-ART DOCUMENT

Patent Document

Patent Document 1: Japanese Unexamined Patent Application Publication No. 2005-208968

SUMMARY

In a first aspect, a power supply circuit includes a reference voltage generation circuit configured to generate a reference voltage that is lower than an input voltage; a first regulator configured to generate a first power supply voltage that is higher than the reference voltage based on the input voltage and the reference voltage; a first starting circuit configured to control the reference voltage generation circuit such that the reference voltage rises after the input voltage rises; and a second starting circuit configured to control the first regulator such that the first power supply voltage rises after the reference voltage rises.

In a second aspect, in the power supply circuit in the first aspect, a first starting circuit may include a first delay circuit configured to determine a first time period from a rise of the input voltage, and the first starting circuit may be configured to raise the reference voltage after the first time period elapses.

In a third aspect, in the power supply circuit in the second aspect, the first starting circuit may be configured to assert a first start signal used in the reference voltage generation circuit after the first time period elapses.

In a fourth aspect, in the power supply circuit in the third aspect, the reference voltage generation circuit may include a bandgap reference circuit configured to generate the reference voltage, and the bandgap reference circuit may be configured to raise the reference voltage upon occurrence of a condition in which the first start signal is asserted.

In a fifth aspect, in the power supply circuit in the third or fourth aspect, the second starting circuit may be configured to raise the first power supply voltage after the first start signal is asserted.

In a sixth aspect, in the power supply circuit in the fifth aspect, the second starting circuit may include a second delay circuit configured to determine a second time period after the first start signal is asserted, and the second starting circuit may be configured to raise the first power supply voltage after the second time period elapses.

In a seventh aspect, in the power supply circuit in the sixth aspect, the second starting circuit may be configured to assert a second start signal to start the first regulator after the second time period elapses.

In an eighth aspect, in the power supply circuit in any one of the first to seventh aspects, the power supply circuit may further include a second regulator configured to generate a second power supply voltage that is higher than the reference voltage based on the first power supply voltage and the reference voltage. The second starting circuit may be configured to control the second regulator such that the second power supply voltage rises after the first power supply voltage rises.

In a ninth aspect, in the power supply circuit in the eighth aspect, the second starting circuit may include a second delay circuit configured to generate a second time period from a rise of the reference voltage, and a third delay circuit configured to generate a third time period that is longer than the second time period with respect to the rise of the reference voltage. The second starting circuit may be configured to raise the first power supply voltage after the second time period elapses, and raise the second power supply voltage after the third time period elapses.

In a tenth aspect, in the power supply circuit in the ninth aspect, the second delay circuit may constitute part of the third delay circuit.

In an eleventh aspect, a first starting circuit may be configured to raise a reference voltage after a first delay time period elapses from a rise of an input voltage, and a second starting circuit may be configured to raise a first power supply voltage after a second delay time period elapses, the second delay time period being longer than the first delay time period with respect to the rise of the input voltage.

In a twelfth aspect, in the power supply circuit in the eleventh aspect, the supply circuit may further include a second regulator configured to generate a second power supply voltage that is higher than the reference voltage based on the first power supply voltage and the reference voltage. The second starting circuit may be configured to raise the first power supply voltage and the second power supply voltage after the second delay time period elapses from the rise of the input voltage.

In a thirteenth aspect, in the power supply circuit in the twelfth aspect, a delay time period that is longer than the second delay time period with respect to the rise of the input voltage is given as a third delay time period, and the second starting circuit may be configured to raise the first power supply voltage within a time period from an end of the second delay time period to an end of the third delay time period, and raise the second power supply voltage after the third delay time period elapses.

In a fourteenth aspect, a starting method for a power supply circuit is provided. The power supply circuit includes a reference voltage generation circuit configured to generate a reference voltage that is lower than an input voltage, and a first regulator configured to generate a first power supply voltage that is higher than the reference voltage based on the input voltage and the reference voltage. The starting method includes raising the reference voltage after the input voltage rises, and raising the first power supply voltage after the reference voltage rises.

DETAILED DESCRIPTION

The inventor of this application has recognized the following information in related art. A power supply circuit may include both a reference voltage generation circuit for generating a reference voltage that is lower than an input voltage and a regulator for generating a power supply voltage that is higher than the reference voltage based on the input voltage and the reference voltage. In this case, if the reference power generation circuit and the regulator operate at the same timing as a rise of the input voltage, an internal signal state of the reference power generation circuit or the regulator becomes unstable, and as a result, a transient fluctuation of a power supply voltage may be increased.

The present disclosure provides a power supply circuit and a starting method for the power supply circuit that are capable of suppressing a transient fluctuation of a power supply voltage generated by a regulator.

Hereinafter, various embodiments of the present disclosure will be described with reference to the drawings.

Figure 1:
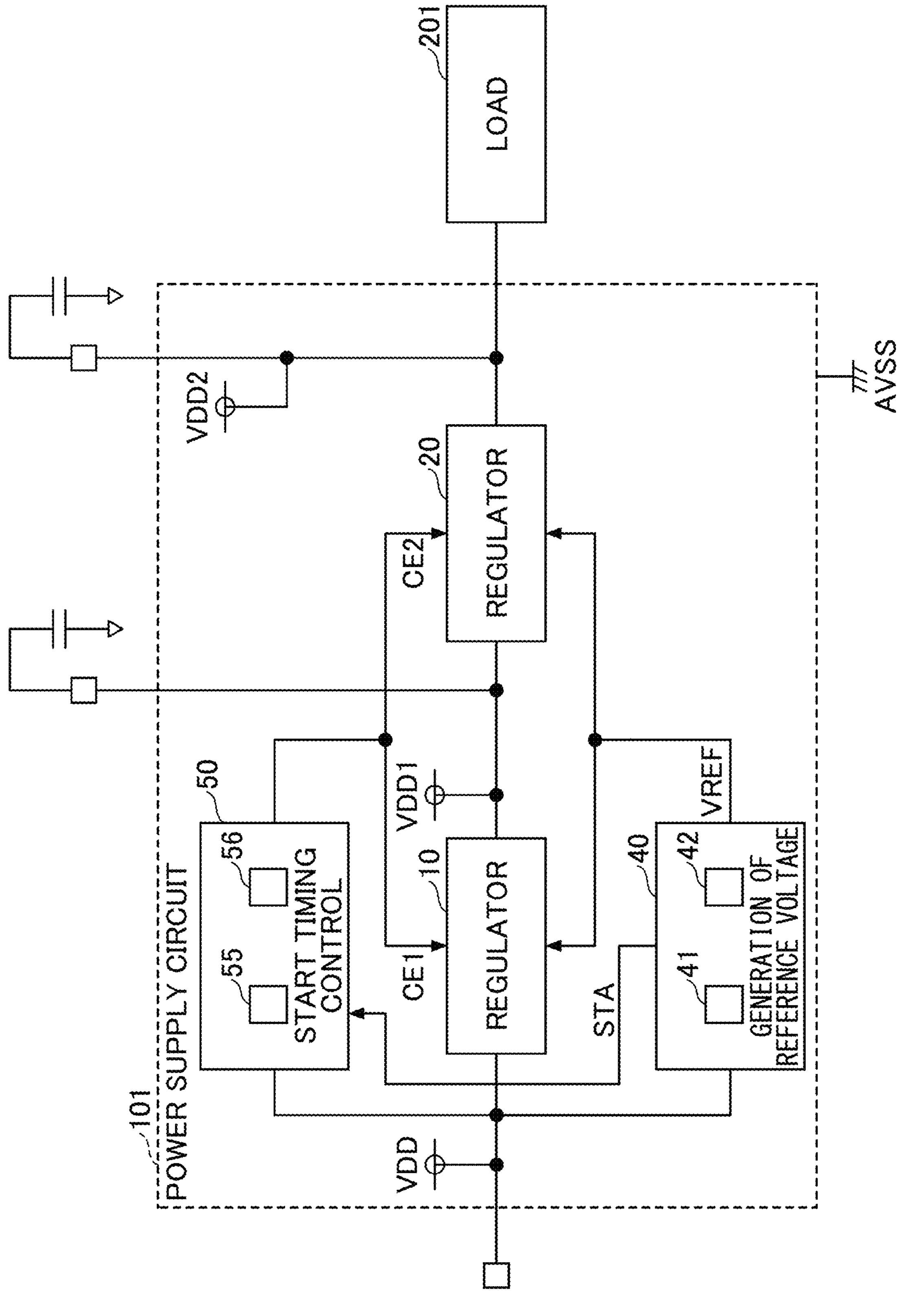
FIG. 1 is a diagram showing a configuration example of a power supply circuit according to a first embodiment.

FIG. 1 is a diagram showing a configuration example of the power supply circuit according to a first embodiment. A power supply circuit 101 shown in FIG. 1 generates a first power supply voltage VDD1 and a second power supply voltage VDD2 based on an input voltage VDD, and supplies the second power supply voltage VDD2 to a load 201. The power supply circuit 101 is, for example, a semiconductor integrated circuit that operates using a ground AVSS as a reference potential. The power supply circuit 101 includes a reference voltage generation circuit 40, a first regulator 10, a second regulator 20, and a start timing control circuit 50.

The reference voltage generation circuit 40 generates a reference voltage VREF that is lower than an input voltage VDD. The reference voltage generation circuit 40 generates a constant reference voltage VREF that is lower than the input voltage VDD by using, for example, a bandgap reference circuit 42. The reference voltage generation circuit 40 may generate the reference voltage VREF by any known technique (for example, a voltage dividing circuit or the like for dividing the input voltage VDD by a resistance) that does not use a bandgap reference circuit.

The input voltage VDD is, for example, a power supply voltage supplied from the outside of the power supply circuit 101. For example, a voltage magnitude V1 at a steady state that is held after the input voltage VDD rises is 5 volts, and a constant voltage magnitude V2 after the reference voltage VREF rises is 1.25 volts.

The first regulator 10 is a circuit for generating the first power supply voltage VDD1 that is higher than the reference voltage VREF based on the input voltage VDD and the reference voltage VREF. The first regulator 10 controls the first power supply voltage VDD1 to be held at a constant voltage magnitude V3 that is greater than the reference voltage VREF.

The first regulator 10 is, for example, a linear regulator that controls the first power supply voltage VDD1 to be held at the constant voltage magnitude V3 that is less than the input voltage VDD and greater than the reference voltage VREF. A specific example of the first regulator 10 includes a low drop out (LDO) regulator that operates even if there is a small difference between the input voltage and an output voltage.

The voltage magnitude V3 at the steady state that is held after the first power supply voltage VDD1 rises is, for example, 3.3 volts.

The first regulator 10 may be a switching regulator that controls the first power supply voltage VDD1 to be held at the constant voltage magnitude V3 that is less than or greater than the input voltage VDD and greater than the reference voltage VREF.

The second regulator 20 is a circuit for generating the second power supply voltage VDD2 that is higher than the reference voltage VREF based on the first power supply voltage VDD1 and the reference voltage VREF. The second regulator 20 controls the second power supply voltage VDD2 to be held at a constant voltage magnitude V4 that is greater than the reference voltage VREF.

The second regulator 20 is, for example, a linear regulator that controls the second power supply voltage VDD2 to be held at the constant voltage magnitude V4 that is less than the first power supply voltage VDD1 and greater than the reference voltage VREF. A specific example of the second regulator 20 includes an LDO regulator that operates even if there is a small difference between the input voltage and the output voltage.

The voltage magnitude V4 at the steady state that is held after the second power supply voltage VDD2 rises is, for example, 1.8 volts.

The second regulator 20 may be a switching regulator that controls the second power supply voltage VDD2 to be held at the constant voltage magnitude V4 that is less than or greater than the first power supply voltage VDD1 and greater than the reference voltage VREF.

The start timing control circuit 50 controls start timings of the first regulator 10 and the second regulator 20.

Figure 2:
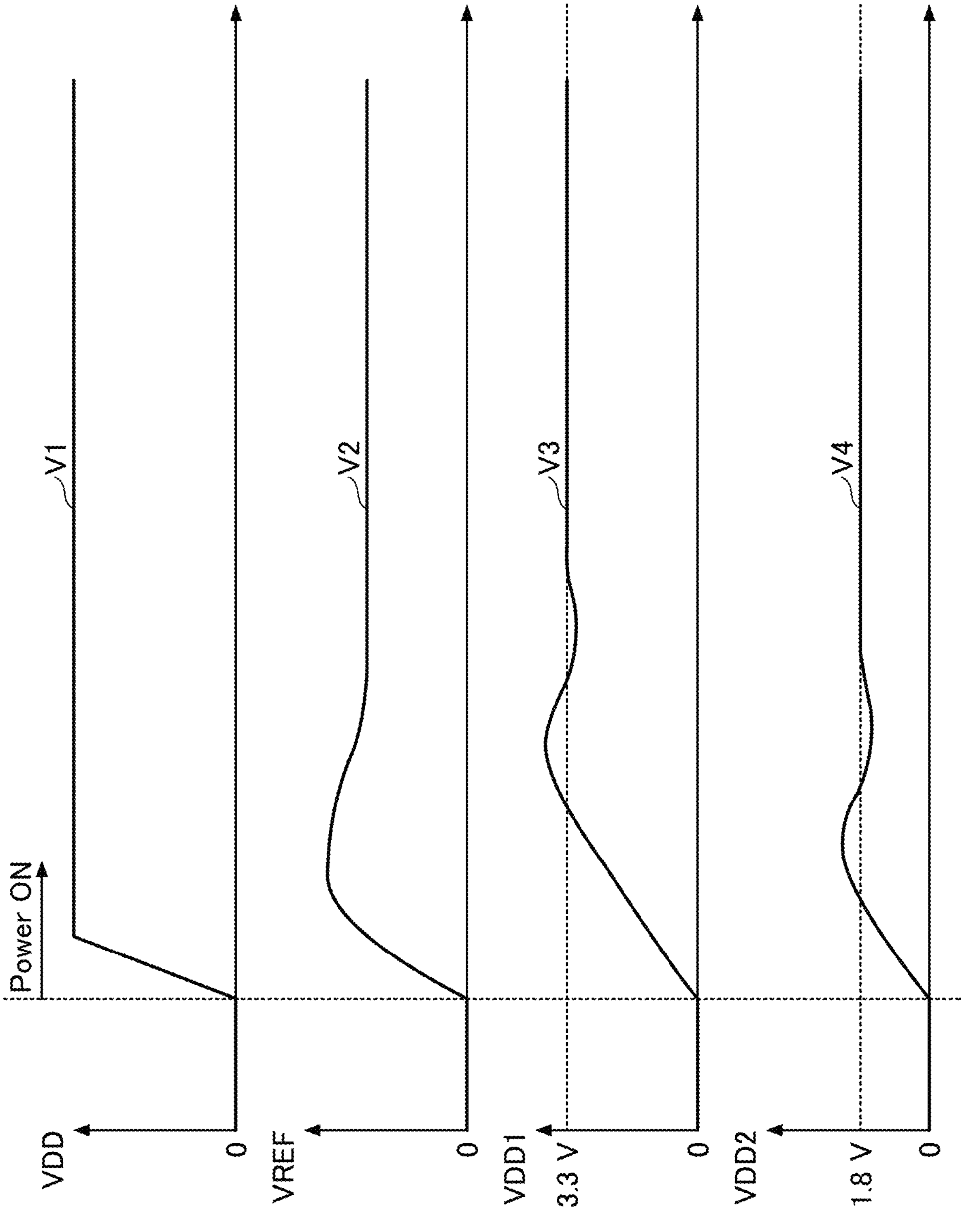
FIG. 2 is a timing chart showing a voltage behavior at startup of the power supply circuit in a comparative example.
Figure 3:
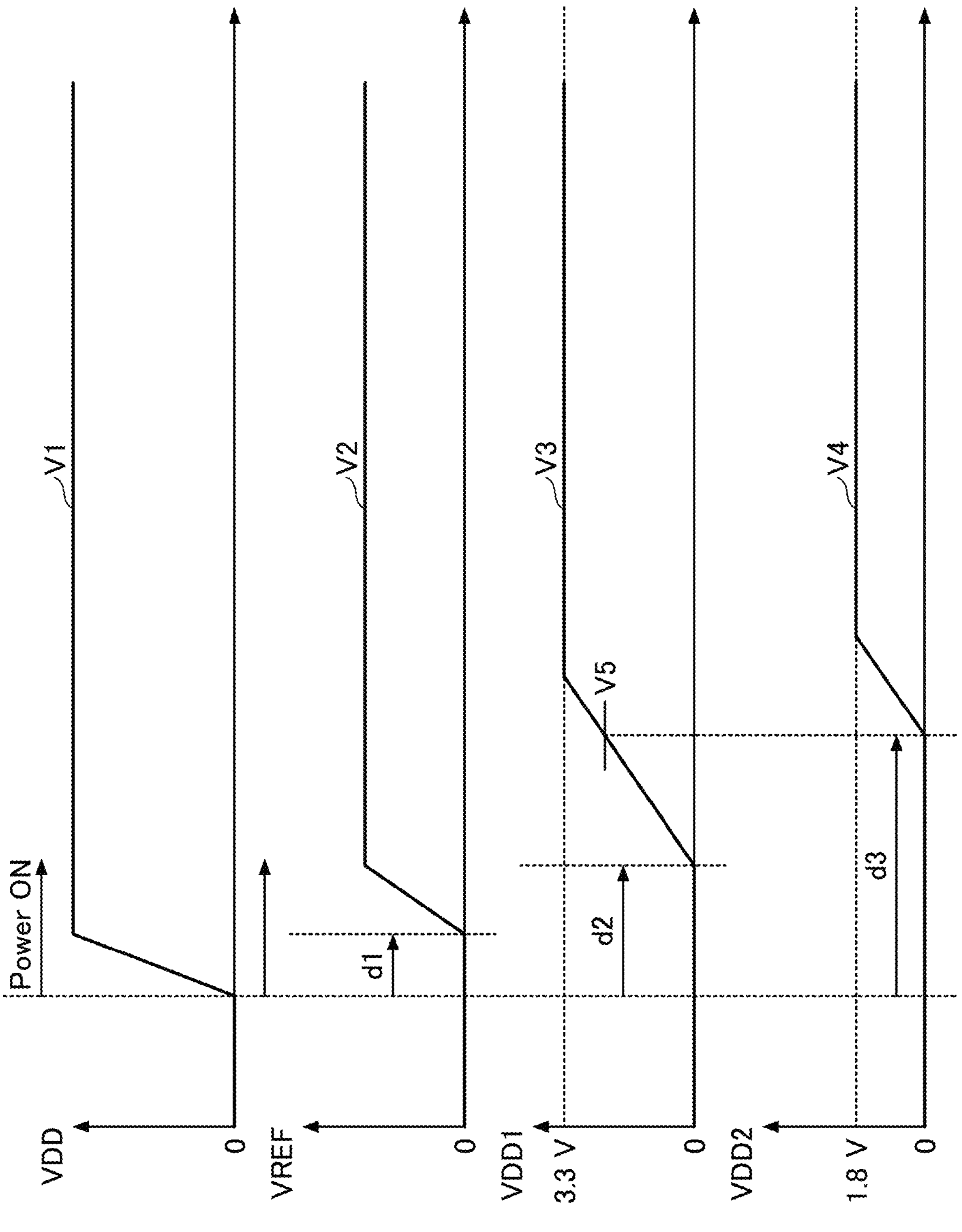
FIG. 3 is a timing chart showing an example of the voltage behavior at startup of the power supply circuit according to the first embodiment.

FIG. 2 is a timing chart showing a voltage behavior at startup of the power supply circuit in a comparative example. FIG. 3 is a timing chart showing an example of the voltage behavior at startup of the power supply circuit according to the first embodiment. The power supply circuit in the comparative example differs from the power supply circuit 101 according to the first embodiment in that the power supply circuit does not include the start timing control circuit 50.

As shown in FIG. 2, if the reference voltage generation circuit 40, the first regulator 10, and the second regulator 20 operate simultaneously with the rise of the input voltage VDD, an internal signal state of the reference voltage generation circuit 40, the first regulator 10, or the second regulator 20 may become unstable. In this case, a transient fluctuation of the reference voltage VREF, the first power supply voltage VDD1, or the second power supply voltage VDD2 may be increased.

If the transient fluctuation of the reference voltage VREF is increased, a malfunction or breakdown of the first regulator 10 or the second regulator 20 to which the reference voltage VREF is input is likely to occur. If the transient fluctuation of the first power supply voltage VDD1 is increased, the malfunction or breakdown of the second regulator 20 to which the first power supply voltage VDD1 is input is likely to occur. If the transient fluctuation of the second power supply voltage VDD2 is increased, the malfunction or breakdown of the load 201 to which the second power supply voltage VDD2 is input is likely to occur.

On the other hand, in the case in FIG. 3, the reference voltage generation circuit 40 raises the reference voltage VREF after the lapse of a first delay time period d1 from a rise of the input voltage VDD. The start timing control circuit 50 controls the start of the first regulator 10 such that the first power supply voltage VDD1 rises after the lapse of a second delay time period d2 from the rise of the input voltage VDD. The second delay time period d2 is longer than the first delay time period d1. The start timing control circuit 50 controls the start of the second regulator 20 such that the second power supply voltage VDD2 rises after the lapse of a third delay time period d3 from the rise of the input voltage VDD. The third delay time period d3 is longer than the second delay time period d2.

With this approach, the reference voltage VREF rises after the lapse of the first delay time period d1 from the rise of the input voltage VDD. Then, the first power supply voltage VDD1 rises after the lapse of the second delay time period d2 that is longer than the first delay time period d1 with respect to the rise of the input voltage VDD. In addition, the second power supply voltage VDD2 rises after the lapse of the third delay time period d3 that is longer than the second delay time period d2 with respect to the rise of the input voltage VDD. By controlling rising timings of voltages that are generated by respective circuits by the starting method described above, the stability of the internal signal state of each of the reference voltage generation circuit 40, the first regulator 10, and the second regulator 20 is enhanced, and then the voltages generated by the respective circuits rise. With this arrangement, in FIG. 3, as compared to the case shown in FIG. 2, an increasing transient fluctuation of each the reference voltage VREF, the first power supply voltage VDD1, and the second power supply voltage VDD2 is suppressed. Therefore, the malfunction or breakdown of the first regulator 10, the second regulator 20, and the load 201 is unlikely to occur.

In FIG. 3, the start timing control circuit 50 controls the start of the first regulator 10 such that the first power supply voltage VDD1 rises within a time period from the end of the second delay time period d2 to the end of the third delay time period d3. With this arrangement, the first power supply voltage VDD1 rises before the rise of the second power supply voltage VDD2, and thus an increasing transient fluctuation of the second power supply voltage VDD2 that is generated by the second regulator 20 based on the first power supply voltage VDD1 is suppressed. Therefore, the malfunction or breakdown of the load 201 is unlikely to occur.

The first delay time period d1 is set, for example, to be equal to or longer than a time period in which the input voltage VDD is increased from zero to the voltage magnitude V1. In this arrangement, the reference voltage generation circuit 40 can raise the reference voltage VREF after increasing the input voltage VDD to the voltage magnitude V1 and thereby enhancing the stability of the internal signal state of the reference voltage generation circuit 40. Therefore, increases in the transient fluctuation of the reference voltage VREF are suppressed.

The second delay time period d2 is set, for example, equal to or longer than a time period in which the reference voltage VREF is increased from zero to the voltage magnitude V2 after the input voltage VDD rises from zero. In this arrangement, the first regulator 10 can raise the first power supply voltage VDD1 after increasing the reference voltage VREF to the voltage magnitude V2 and thereby enhancing the stability of the internal signal state of the first regulator 10. Therefore, increases in the transient fluctuation of the first power supply voltage VDD1 are suppressed.

The third delay time period d3 is set, for example, to be equal to or longer than a time period in which the first power supply voltage VDD1 is increased from zero to a voltage magnitude V5 after the input voltage VDD rises from zero. In this arrangement, the second regulator 20 can raise the second power supply voltage VDD2 after increasing the first power supply voltage VDD1 to the voltage magnitude V5 and thereby enhancing the stability of the internal signal state of the second regulator 20. Therefore, increases in the transient fluctuation of the second power supply voltage VDD2 are suppressed. The voltage magnitude V5 is greater than the voltage magnitude V4 and less than the voltage magnitude V3, for example.

The third delay time period d3 may be set to be equal to or longer than a time period in which the first power supply voltage VDD1 is increased from zero to the voltage magnitude V3 after the input voltage VDD rises from zero. In this arrangement, the second regulator 20 can raise the second power supply voltage VDD2 after increasing the first power supply voltage VDD1 to the voltage magnitude V3 and thereby enhancing the stability of the internal signal state of the second regulator 20. Therefore, increases in the transient fluctuation of the second power supply voltage VDD2 are suppressed.

In FIG. 1, the reference voltage generation circuit 40 includes a startup circuit 41 for controlling the start of the bandgap reference circuit 42 such that the reference voltage VREF rises after the input voltage VDD rises. The startup circuit 41 is an example of a first starting circuit for raising the reference voltage VREF after the input voltage VDD rises. Although the startup circuit 41 constitutes part of the reference voltage generation circuit 40, the startup circuit 41 may constitute part of the start timing control circuit 50.

The startup circuit 41 may include a first delay circuit that determines a first time period T1 from the rise of the input voltage VDD. The startup circuit 41 asserts a startup signal STA to start the reference voltage generation circuit 40 after a predetermined first time period T1 elapses from the rise of the input voltage VDD. The startup signal STA is an example of a first start signal. The first time period T1 corresponds to the first delay time period d1.

The start timing control circuit 50 controls the start of the first regulator 10 such that the first power supply voltage VDD1 rises after the reference voltage VREF rises. The start timing control circuit 50 is an example of a second start circuit that raises the first power supply voltage VDD1 after the reference voltage VREF rises.

The start timing control circuit 50 includes a first control circuit 55 that asserts an enablement signal CE1 to be input to the first regulator 10 after a predetermined second time period T2 elapses from the asserting of the startup signal STA. The first control circuit 55 is an example of a second delay circuit that determines a second time period T2 from the rise of the reference voltage VREF, or is an example of a second delay circuit that determines the second time period T2 after the first start signal is asserted.

The first regulator 10 raises the first power supply voltage VDD1 when the enablement signal CE1 is asserted. In this arrangement, the first regulator 10 can raise the first power supply voltage VDD1 after the second delay time period d2 elapses from the rise of the input voltage VDD. The enablement signal CE1 is an example of a second start signal.

The start timing control circuit 50 includes a second control circuit 56 that asserts an enablement signal CE2 to be input to the second regulator 20 after a predetermined third time period T3 elapses from the asserting of the startup signal STA. The second control circuit 56 is an example of a third delay circuit that determines the third time period T3 that is longer than the second time period T2, with respect to the rise of the reference voltage VREF. Also, the second control circuit 56 is an example of a third delay circuit that determines the third time period T3 after the first start signal is asserted.

The second regulator 20 raises the second power supply voltage VDD2 when the enablement signal CE2 is asserted. In this arrangement, the second regulator 20 can raise the second power supply voltage VDD2 after the third delay time period d3 elapses from the rise of the input voltage VDD. The enablement signal CE2 is an example of a third start signal.

Figure 4:
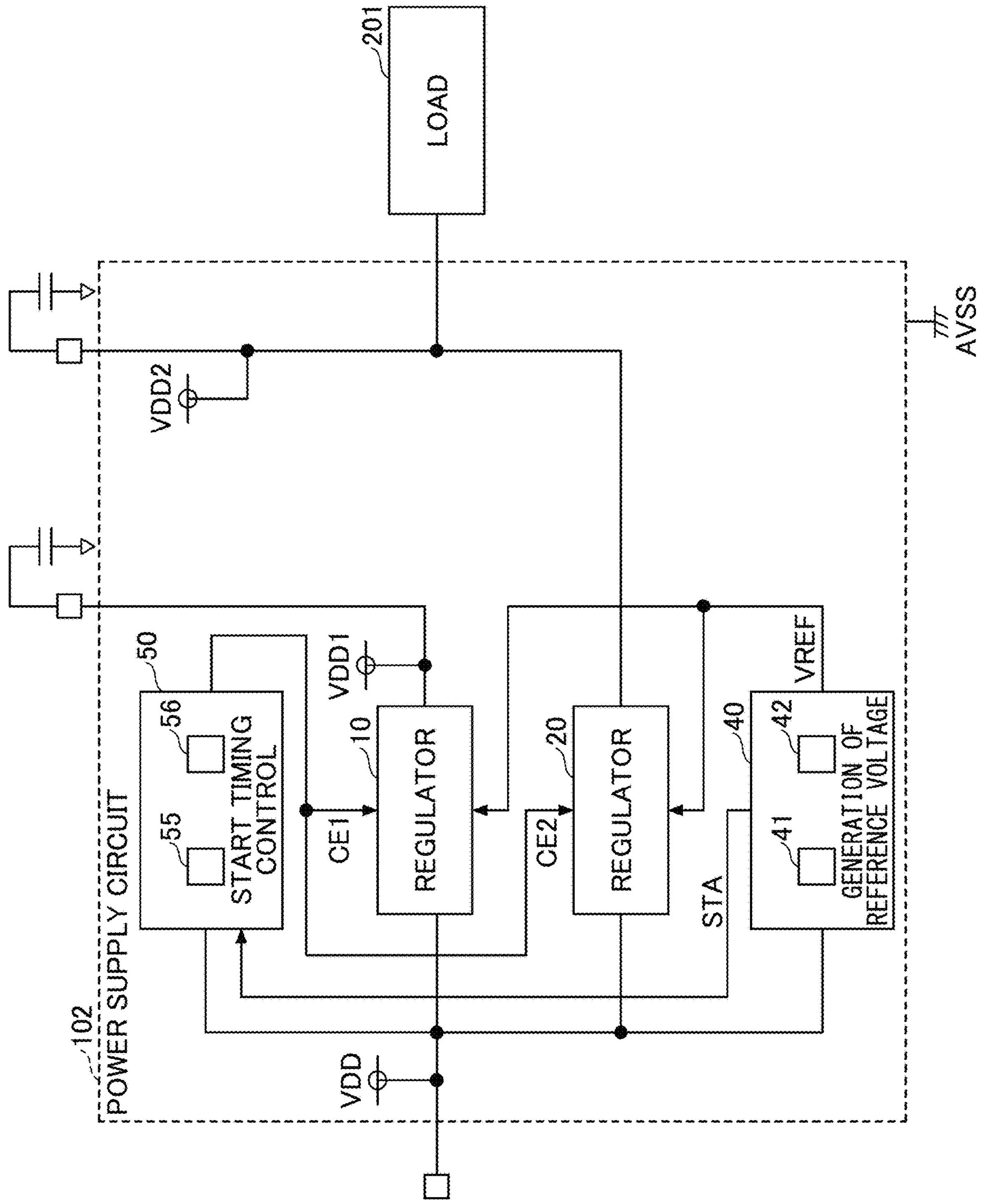
FIG. 4 is a diagram showing a configuration example of the power supply circuit according to a second embodiment.

FIG. 4 is a diagram showing a configuration example of the power supply circuit according to a second embodiment. In the second embodiment, description of the same configuration, operation, and effect as provided in the first embodiment is omitted by referring to the above description. The power supply circuit 102 according to the second embodiment differs from the power supply circuit 101 according to the first embodiment in that the second regulator 20 generates the second power supply voltage VDD2 that is higher than the reference voltage VREF based on the input voltage VDD and the reference voltage VREF.

In the second embodiment, the second regulator 20 is, for example, a linear regulator for controlling the second power supply voltage VDD2 to be held at a constant voltage magnitude V4 that is less than the input voltage VDD and greater than the reference voltage VREF. The second regulator 20 may be a switching regulator for controlling the second power supply voltage VDD2 to be held at the constant voltage magnitude V4 that is less than or greater than the input voltage VDD and greater than that of the reference voltage VREF.

In the second embodiment, rising timings of voltages that are generated by respective circuits are controlled as shown in FIG. 3. With this arrangement, the transient fluctuation of each of the reference voltage VREF, the first power supply voltage VDD1, and the second power supply voltage VDD2 is suppressed. Thus, the malfunction or breakdown of the first regulator 10, the second regulator 20, and the load 201 is unlikely to occur.

In the second embodiment, the start timing control circuit 50 may respectively control the start of the first regulator 10 and the second regulator 20 such that the first power supply voltage VDD1 and the second power supply voltage VDD2 simultaneously rise after the second delay time period d2 elapses from the rise of the input voltage VDD. In this arrangement, the transient fluctuation of each of the first power supply voltage VDD1 and the second power supply voltage VDD2 is suppressed. As a result, the malfunction or breakdown of the second regulator 20 and the load 201 is unlikely to occur.

Figure 5:
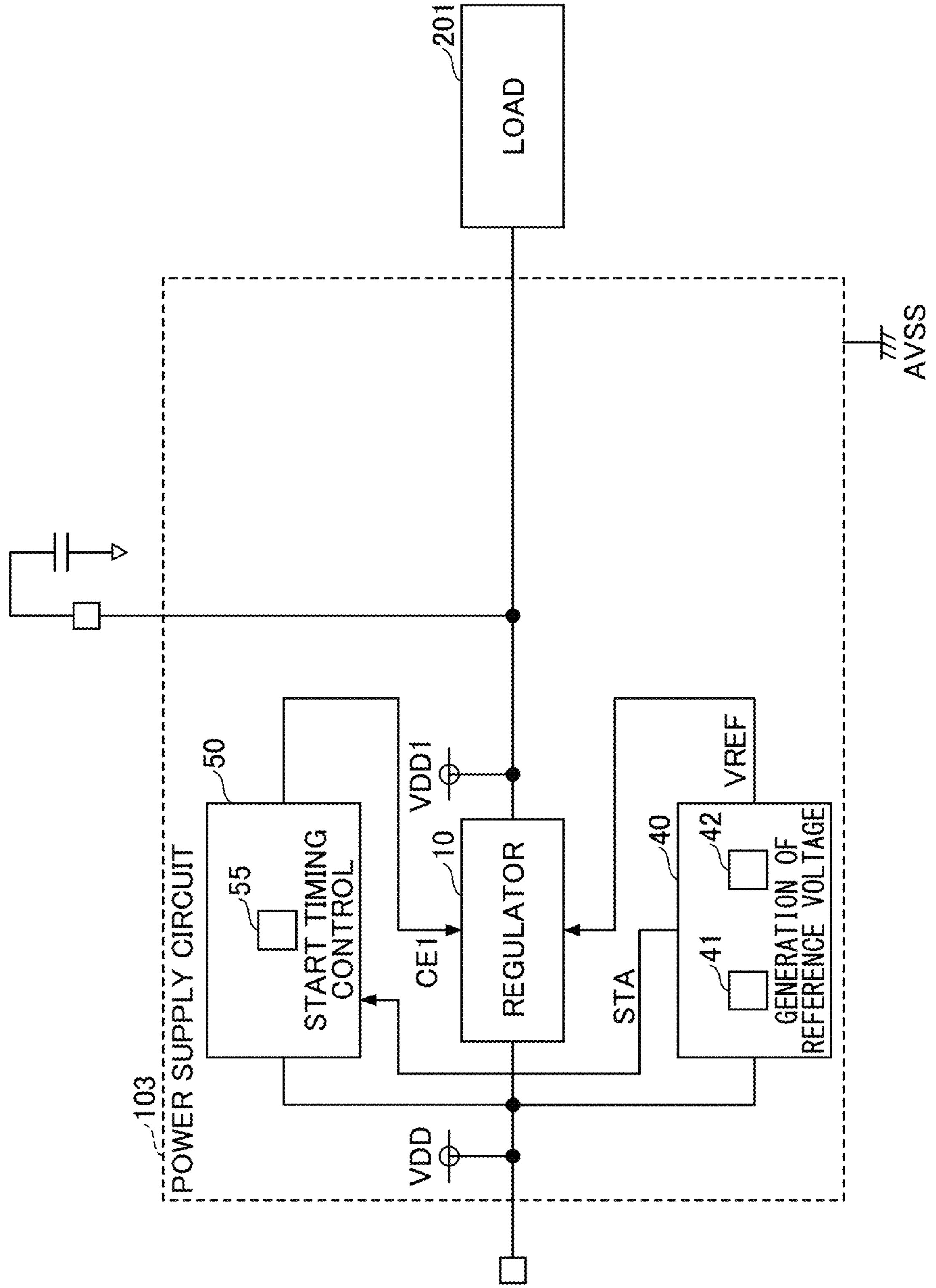
FIG. 5 is a diagram showing a configuration example of the power supply circuit according to a third embodiment.

FIG. 5 is a diagram showing a configuration example of the power supply circuit according to a third embodiment. In the third embodiment, description of the same configuration, operation, and effect as provided in the first embodiment is omitted by referring to the above description. The power supply circuit 103 according to the third embodiment differs from the power supply circuit 101 according to the first embodiment in that the first power supply voltage VDD1 generated by the first regulator 10 is supplied to the load 201 without using the second regulator 20.

In the third embodiment, rising timings of voltages generated by respective circuits are controlled as shown in FIG. 3. With this arrangement, the transient fluctuation of each of the reference voltage VREF and the first power supply voltage VDD1 is suppressed. Thus, the malfunction or breakdown of the first regulator 10 and the load 201 is unlikely to occur.

Figure 6:
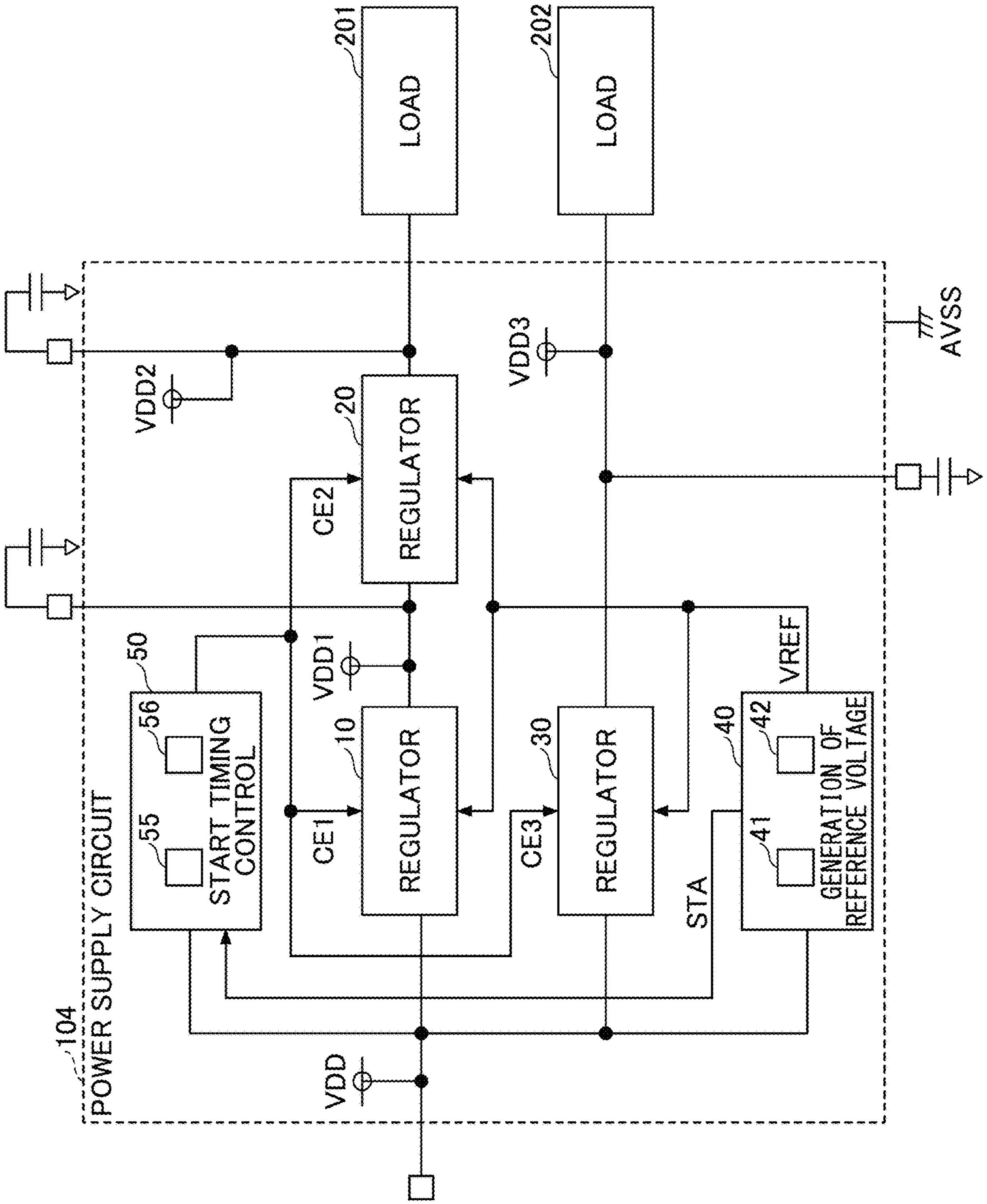
FIG. 6 is a diagram showing a configuration example of the power supply circuit according to a fourth embodiment.

FIG. 6 is a diagram showing a configuration example of the power supply circuit according to a fourth embodiment. In the fourth embodiment, description of the same configuration, operation, and effect as provided in the first embodiment is omitted by referring to the above description. A power supply circuit 104 according to the fourth embodiment differs from the power supply circuit 101 according to the first embodiment in that the power supply circuit 104 further includes a third regulator 30.

The third regulator 30 is a circuit for generating a third power supply voltage VDD3 that is higher than the reference voltage VREF based on the input voltage VDD and the reference voltage VREF. The third regulator 30 controls the third power supply voltage VDD3 to be held at a constant voltage magnitude V6 that is greater than the reference voltage VREF. The third power supply voltage VDD3 is supplied to the load 202.

The third regulator 30 is, for example, a linear regulator for controlling the third power supply voltage VDD3 to be held at the constant voltage magnitude V6 that is less than the input voltage VDD and greater than the reference voltage VREF. A specific example of the third regulator 30 is an LDO regulator that operates even if there is a small difference between the input voltage and the output voltage.

The voltage magnitude V6 at the steady state that is held after the third power supply voltage VDD3 rises is, for example, 2.5 volts.

The third regulator 30 may be a switching regulator for controlling the third power supply voltage VDD3 to be held at the constant voltage magnitude V6 that is less than or greater than the input voltage VDD and greater than the reference voltage VREF.

In the fourth embodiment, rising timings of voltages that are generated by respective circuits are controlled as shown in FIG. 3. With this arrangement, the transient fluctuation of each of the reference voltage VREF, the first power supply voltage VDD1, the second power supply voltage VDD2, and the third power supply voltage VDD3 is suppressed. Thus, the malfunction or breakdown of the first regulator 10, the second regulator 20, the third regulator 30, the load 201, and the load 202 is unlikely to occur.

In the fourth embodiment, the start timing control circuit 50 may respectively control the start of the first regulator 10 and the third regulator 30 such that the first power supply voltage VDD1 and the third power supply voltage VDD3 rise simultaneously or with a time shift after the second delay time period d2 elapses from the rise of the input voltage VDD. With this arrangement, the transient fluctuation of the first power supply voltage VDD1 or the third power supply voltage VDD3 is suppressed. Thus, the malfunction or breakdown of the second regulator 20, the load 201 and the load 202 is unlikely to occur.

The start timing control circuit 50 asserts an enablement signal CE3 to be input to the third regulator 30 after a predetermined second time period T2 or a predetermined fourth time period T4 elapses from the asserting of the startup signal STA. When the enablement signal CE3 is asserted, the third regulator 30 raises the third power supply voltage VDD3. In this arrangement, the third regulator 30 can raise the third power supply voltage VDD3 after a second delay time period d2 elapses from the rise of the input voltage VDD. The enablement signal CE3 is an example of a fourth start signal.

Figure 7:
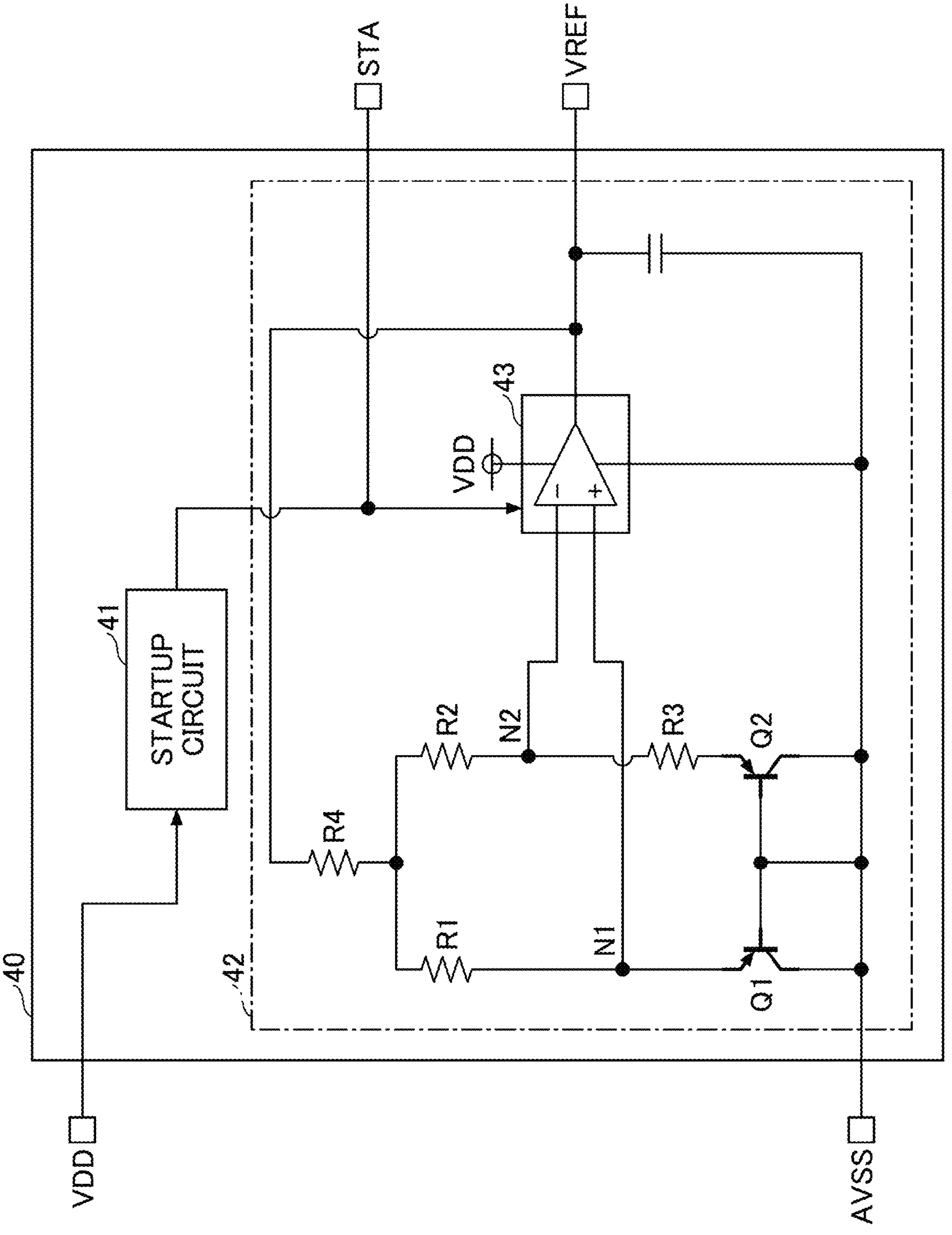
FIG. 7 is a diagram showing a configuration example of a reference voltage generation circuit.

FIG. 7 is a diagram showing a configuration example of the reference voltage generation circuit. The reference voltage generation circuit 40 includes a startup circuit 41 and a bandgap reference circuit 42.

The startup circuit 41 asserts the startup signal STA to control the start of the reference voltage generation circuit 40 such that the reference voltage VREF rises after a predetermined first time period T1 elapses from the rise of the input voltage VDD. The first time period T1 corresponds to the first delay time period d1.

The bandgap reference circuit 42 includes resistors R1, R2, R3, and R4, a pair of diodes (in this example, PNP bipolar transistors Q1 and Q2 coupled to respective diodes are shown), and an operational amplifier 43. The bandgap reference circuit 42 may have any other known circuit configuration.

The operational amplifier 43 operates in accordance with the input voltage VDD. The operational amplifier 43 includes a non-inverting input terminal that is coupled to a node N1 between an emitter of the bipolar transistor Q1 and a resistor R1. The operational amplifier 43 also includes an inverting input terminal that is coupled to a node N2 between a resistor R2 and a resistor R3. The resistor R3 is coupled in series between a node N2 and an emitter of the bipolar transistor Q2. An output terminal of the operational amplifier 43 is coupled to the node N1 through resistors R4 and R1, and is coupled to the node N2 through resistors R4 and R2.

In such a configuration, the bandgap reference circuit 42 can maintain the reference voltage VREF at a constant magnitude (about 1.25 volts) even when the input voltage VDD or the ambient temperature varies.

The bandgap reference circuit 42 raises the reference voltage VREF when the startup signal STA is asserted. In this arrangement, the reference voltage generation circuit 40 can output the reference voltage VREF after increasing the input voltage VDD to the voltage magnitude V1 at the steady state and thereby enhancing the stability of the internal signal state of the bandgap reference circuit 42.

For example, when the startup signal STA is asserted, the input voltage VDD is applied to the operational amplifier 43. As a result, the reference voltage VREF is output from the reference voltage generation circuit 40 to regulators.

Figure 8:
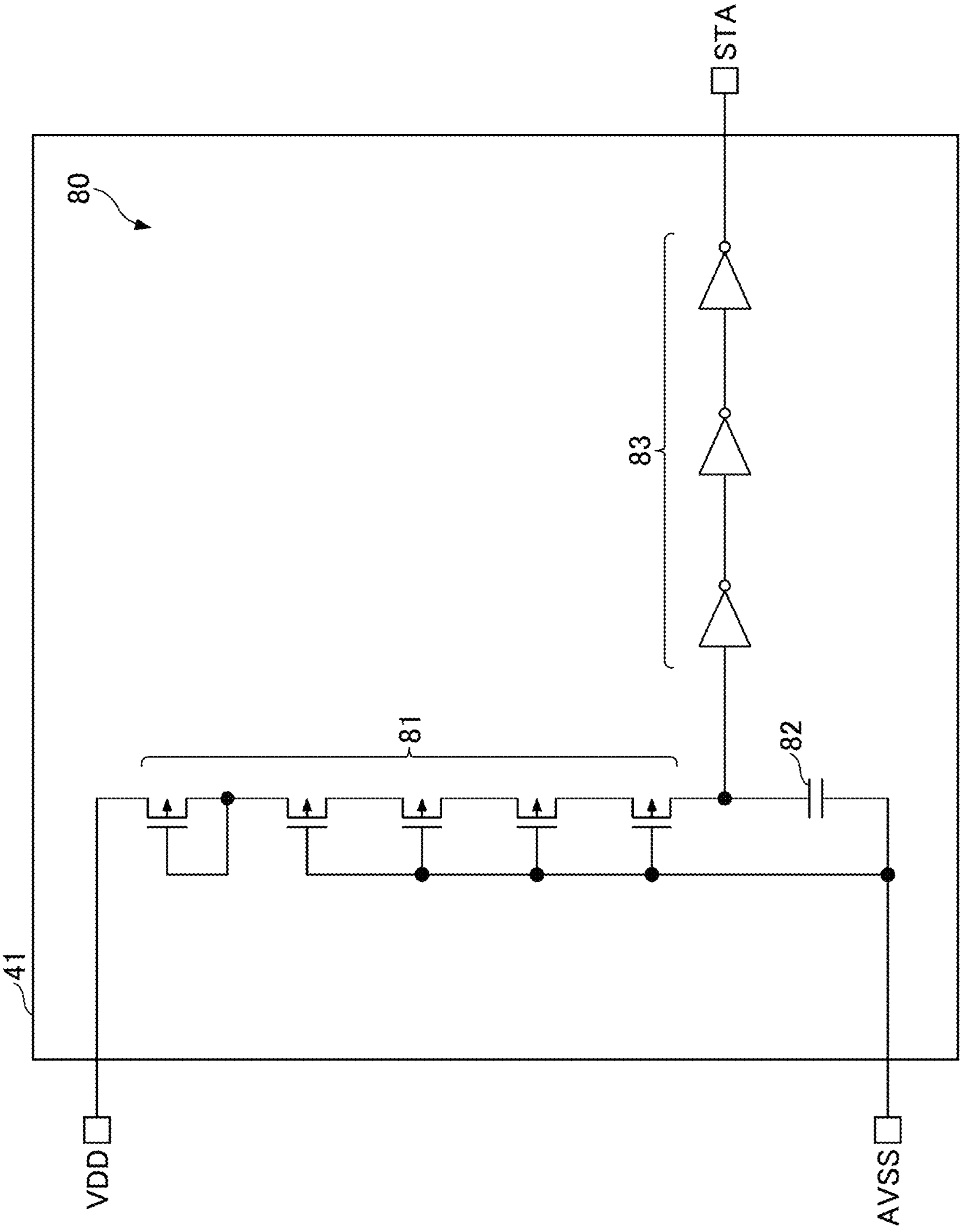
FIG. 8 is a diagram showing a configuration example of a startup circuit.

FIG. 8 is a diagram showing a configuration example of the startup circuit. The startup circuit 41 includes a first delay circuit 80 for determining the first time period T1 from the rise of the input voltage VDD. The startup circuit 41 asserts the startup signal STA to raise the reference voltage VREF after the lapse of the first time period T1.

The first delay circuit 80 includes a capacitor 82, a charge circuit 81 for charging the capacitor 82 with the input voltage VDD, and a buffer circuit 83 to which a voltage of the capacitor 82 is applied and from which the startup signal STA is output. The charge circuit 81 includes metal oxide semiconductor field effect transistors (MOSFETs) that are coupled in series with the capacitor 82. The MOSFETs include a first MOSFET that is coupled to a diode, and includes a plurality of second MOSFETs whose gates are coupled to one another. A source of the first MOSFET is coupled to a terminal to which the input voltage VDD is applied. The gates of the second MOSFETs are each coupled to the ground AVSS.

Figure 9:
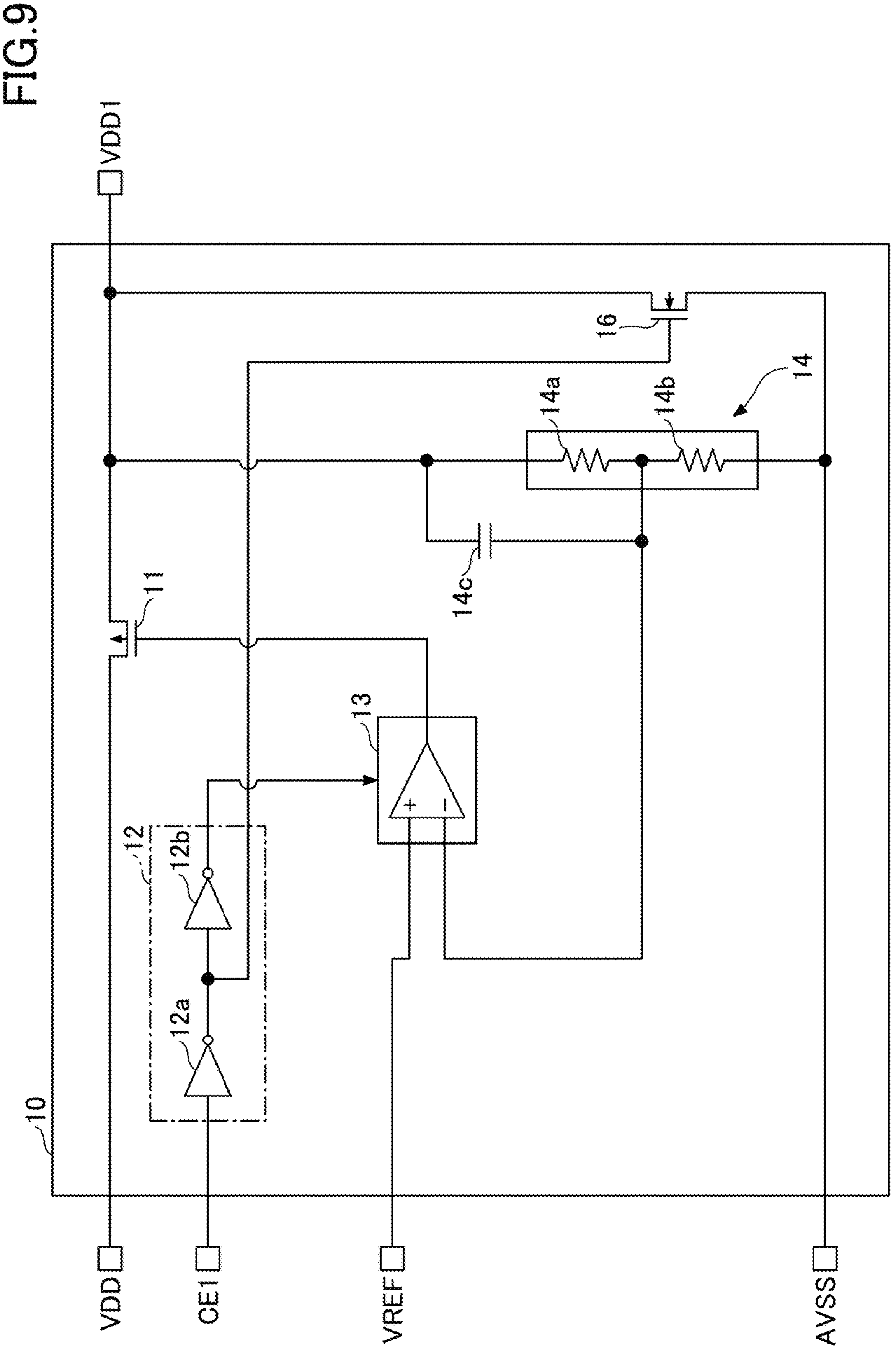
FIG. 9 is a diagram showing a configuration example of a first regulator.

FIG. 9 is a diagram showing a configuration example of the first regulator. The first regulator 10 includes an output transistor 11, an input circuit 12, an error amplifier 13, a feedback circuit 14, and a discharge transistor 16. The input circuit 12 includes an inverter 12*a* and an inverter 12*b*. The feedback circuit 14 includes a capacitor 14*c* and bleeder resistors 14*a* and 14*b*.

When the enablement signal CE1 is asserted, the input circuit 12 turns off the discharge transistor 16 in accordance with the output of the inverter 12*a*, and starts the error amplifier 13 for controlling the output transistor 11, in accordance with the output of the inverter 12*b*. The error amplifier 13 controls a gate of the output transistor 11 according to a difference between the reference voltage VREF from the reference voltage generation circuit 40 and a feedback voltage output from the feedback circuit 14. In this arrangement, the first regulator 10 maintains the first power supply voltage VDD1 at a constant voltage magnitude.

When the enablement signal CE1 is negated, the input circuit 12 turns on the discharge transistor 16 in accordance with the output of the inverter 12*a*, and stops the error amplifier 13 for controlling the output transistor 11, in accordance with the output of the inverter 12*b*. In this arrangement, the first regulator 10 reduces the first power supply voltage VDD1 to zero.

Figure 10:
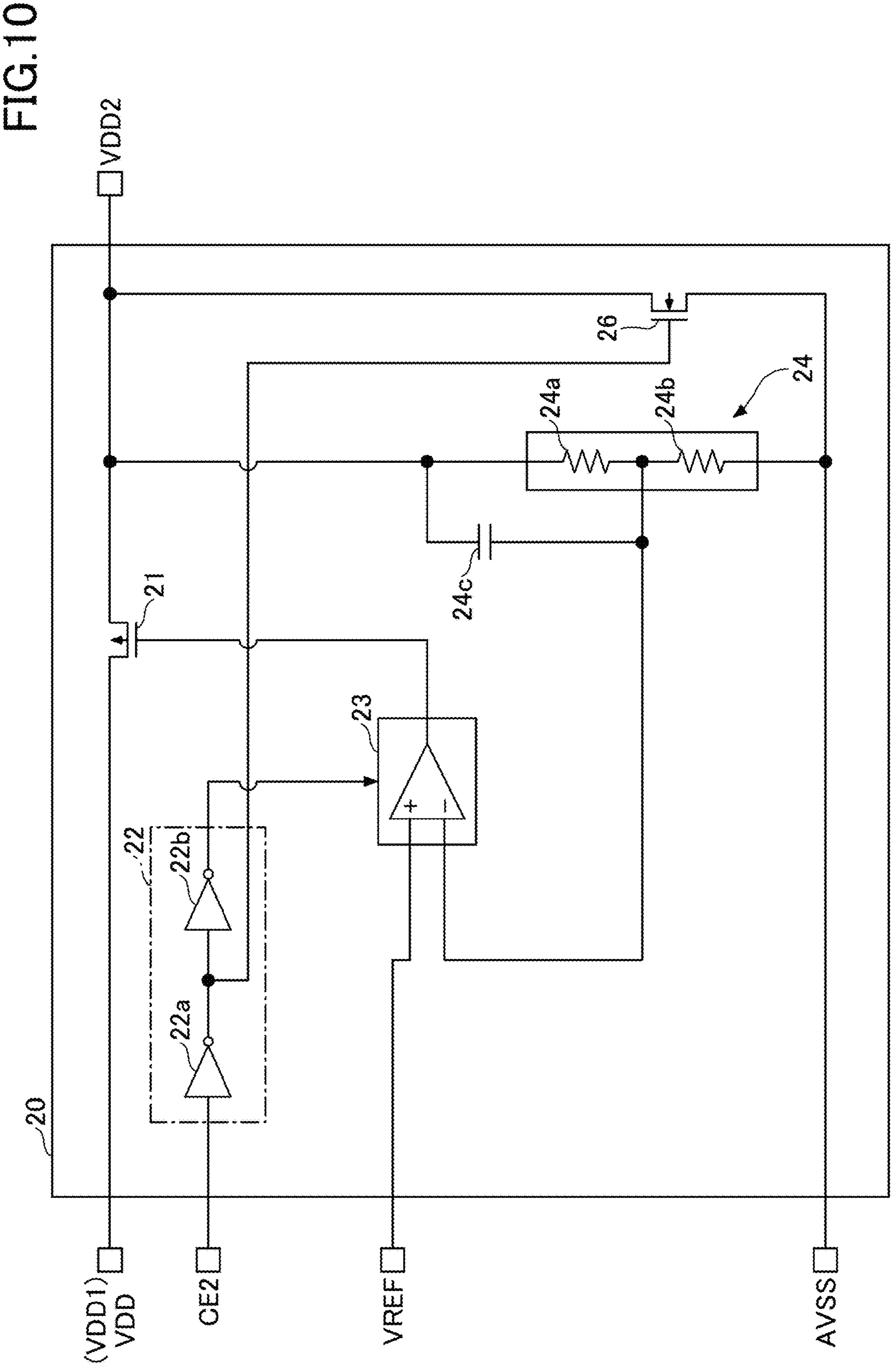
FIG. 10 is a diagram showing a configuration example of a second regulator.

FIG. 10 is a diagram showing a configuration example of the second regulator. The second regulator 20 includes an output transistor 21, an input circuit 22, an error amplifier 23, a feedback circuit 24, and a discharge transistor 26. The input circuit 22 includes an inverter 22*a* and an inverter 22*b*. The feedback circuit 24 includes a capacitor 24*c* and bleeder resistors 24*a* and 24*b*. The second regulator 20 differs from the first regulator 10 in the size of the output transistor and resistance values of the bleeder resistors.

When the enablement signal CE2 is asserted, the input circuit 22 turns off the discharge transistor 26 in accordance with the output of the inverter 22*a*, and starts the error amplifier 23 for controlling the output transistor 21, in accordance with the output of the inverter 22*b*. The error amplifier 23 controls the gate of the output transistor 21 according to a difference between the reference voltage VREF from the reference voltage generation circuit 40 and a feedback voltage output from the feedback circuit 24. In this arrangement, the second regulator 20 maintains the second power supply voltage VDD2 at a constant voltage magnitude.

When the enablement signal CE2 is negated, the input circuit 22 turns on the discharge transistor 26 in accordance with the output of the inverter 22*a*, and stops the error amplifier 23 for controlling the output transistor 21, in accordance with the output of the inverter 22*b*. In this arrangement, the second regulator 20 reduces the second power supply voltage VDD2 to zero.

Figure 11:
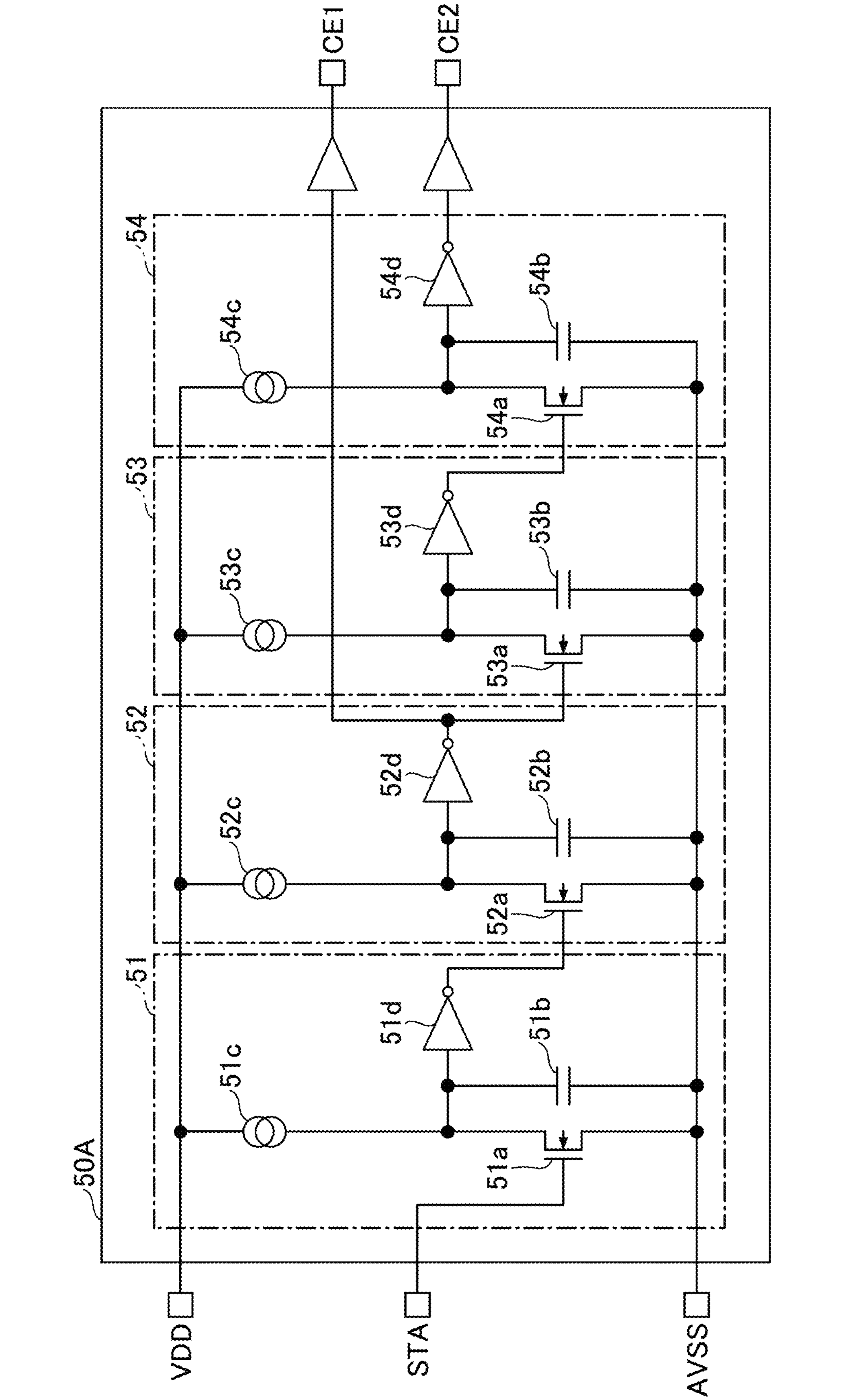
FIG. 11 is a diagram showing a first configuration example of a start timing control circuit.

FIG. 11 is a diagram showing a first configuration example of the start timing control circuit. A start timing control circuit 50A is an example of the start timing control circuit 50. The start timing control circuit 50A includes a plurality (in this example, four) of delay circuits 51, 52, 53, and 54 each of which has the same configuration.

A delay circuit 51 includes a transistor 51*a*, a capacitor 51*b*, a constant current source 51*c*, and an inverting circuit 51*d*. The transistor 51*a* is turned on or off in accordance with a logical level of the startup signal STA that is applied to a gate. The capacitor 51*b* is coupled in parallel with the transistor 51*a*. The capacitor 51*b* is discharged when the transistor 51*a* is turned on, and when the transistor 51*a* is turned off, the capacitor 51*b* is charged in accordance with a constant current that is supplied from the constant current source 51*c*. The inverting circuit 51*d* outputs a signal that is obtained by inverting a voltage level of the capacitor 51*b*, to the delay circuit 52 at a subsequent stage. Each of the delay circuits 52, 53, and 54 receives the output of a corresponding delay circuit of the immediately preceding stage.

The delay circuits 51 and 52 assert the enablement signal CE1 to be input to the first regulator 10 after a predetermined second time period T2 elapses from the asserting of the startup signal STA. A set of delay circuits 51 and 52 is an example of a second delay circuit that determines the second time period T2 from the rise of the reference voltage VREF.

The delay circuits 51, 52, 53 and 54 assert the enablement signal CE2 to be input to the second regulator 20 after a predetermined third time period T3 elapses from the asserting of the startup signal STA. A set of delay circuits 51, 52, 53 and 54 is an example of a third delay circuit that determines the third time period T3 that is longer than the second time period T2 with respect to the rise of the reference voltage VREF.

The delay circuits 51 and 52 that generate the enablement signal CE1 constitute part of the delay circuits 51, 52, 53, and 54 that generate the enablement signal CE2. By sharing circuits, the start timing control circuit 50A that generates the enablement signals CE1 and CE2 can be made compact in the circuit size.

Figure 12:
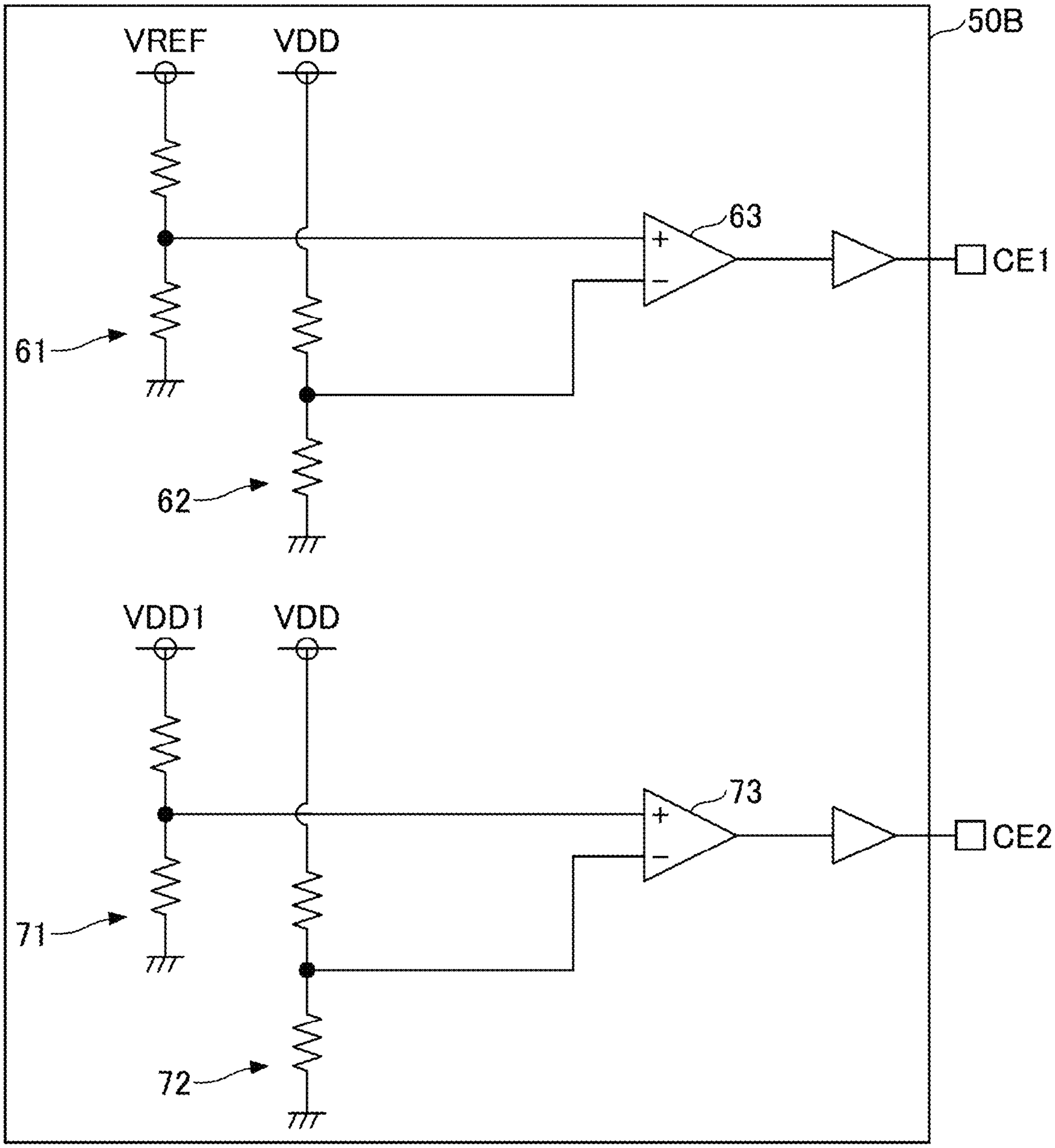
FIG. 12 is a diagram showing a second configuration example of the start timing control circuit.

FIG. 12 is a diagram showing a second configuration example of the start timing control circuit. A start timing control circuit 50B is an example of the start timing control circuit 50. The start timing control circuit 50B includes a voltage dividing circuit 61 for dividing the reference voltage VREF by a resistance, a voltage dividing circuit 62 for dividing the input voltage VDD by a resistance, and a comparison circuit 63 for comparing a divided output of the voltage dividing circuit 61 with a divided output of the voltage dividing circuit 62. The comparison circuit 63 asserts the enablement signal CE1 when the reference voltage VREF is increased to be higher than a first divided voltage of the input voltage VDD. The voltage dividing circuits 61 and 62 and the comparison circuit 63 function as a second delay circuit for determining the second time period T2 from the rise of the reference voltage VREF.

The start timing control circuit 50B includes a voltage dividing circuit 71 for dividing the first power supply voltage VDD1 by a resistance, a voltage dividing circuit 72 for dividing the input voltage VDD by a resistance, and a comparison circuit 73 for comparing a divided output of the voltage dividing circuit 71 with a divided output of the voltage dividing circuit 72. The comparison circuit 73 asserts the enablement signal CE2 when the first power supply voltage VDD1 is increased to be higher than a second divided voltage of the input voltage VDD. The voltage dividing circuits 71 and 72 and the comparison circuit 73 function as a third delay circuit for determining the third time period T3 that is longer than the second time period T2 with reference with the rise of the reference voltage VREF.

Although the embodiments have been described above, these embodiments are presented by way of example, and the present disclosure is not limited to the embodiments. The embodiments described above may be embodied in any other forms. Various combinations, omissions, substitutions, modifications, and the like may be made without departing from the spirit of the present disclosure. The embodiments and modifications may be made without departing from the spirit of the disclosures. The accompanying claims and their equivalents are intended to cover such forms or modifications.

In the present disclosure, a transient fluctuation of a power supply voltage that is generated by a regulator can be suppressed.

What is claimed is:

1. A power supply circuit comprising:

a reference voltage generation circuit configured to generate a reference voltage that is lower than an input voltage;

a first regulator configured to generate a first power supply voltage that is higher than the reference voltage based on the input voltage and the reference voltage;

a first starting circuit configured to control the reference voltage generation circuit such that the reference voltage starts to rise upon expiration of a predetermined delay period from a start of a rise of the input voltage; and a second starting circuit configured to control the first regulator such that the first power supply voltage rises after the reference voltage rises.

2. The power supply circuit according to claim 1, wherein the first starting circuit includes a first delay circuit configured to determine a first time period from the rise of the input voltage, and wherein the first starting circuit is configured to raise the reference voltage after the first time period elapses, the first time period being the predetermined delay period.

3. The power supply circuit according to claim 2, wherein the first starting circuit is configured to assert a first start signal to be input to the reference voltage generation circuit after the first time period elapses.

4. The power supply circuit according to claim 3, wherein the reference voltage generation circuit includes a bandgap reference circuit configured to generate the reference voltage, and wherein the bandgap reference circuit is configured to raise the reference voltage upon occurrence of a condition in which the first start signal is asserted.

5. The power supply circuit according to claim 3, wherein the second starting circuit is configured to raise the first power supply voltage after the first start signal is asserted.

6. The power supply circuit according to claim 5, wherein the second starting circuit includes a second delay circuit configured to determine a second time period after the first start signal is asserted, and wherein the second starting circuit is configured to raise the first power supply voltage after the second time period elapses.

7. The power supply circuit according to claim 6, wherein the second starting circuit is configured to assert a second start signal to be input to the first regulator after the second time period elapses.

8. The power supply circuit according to claim 1, further comprising:

a second regulator configured to generate a second power supply voltage that is higher than the reference voltage based on the first power supply voltage and the reference voltage, wherein the second starting circuit is configured to control the second regulator such that the second power supply voltage rises after the first power supply voltage rises.

9. The power supply circuit according to claim 8, wherein the second starting circuit includes a second delay circuit configured to generate a second time period from a rise of the reference voltage, and a third delay circuit configured to generate a third time period that is longer than the second time period with respect to the rise of the reference voltage, and wherein the second starting circuit is configured to raise the first power supply voltage after the second time period elapses, and raise the second power supply voltage after the third time period elapses.

10. The power supply circuit according to claim 9, wherein the second delay circuit constitutes part of the third delay circuit.

11. The power supply circuit according to claim 1, wherein the first starting circuit is configured to raise the reference voltage after a first delay time period elapses from the rise of the input voltage, and wherein the second starting circuit is configured to raise the first power supply voltage after a second delay time period elapses, the second delay time period being longer than the first delay time period with respect to the rise of the input voltage, and the first delay time period being the predetermined delay period.

12. The power supply circuit according to claim 11, further comprising:

a second regulator configured to generate a second power supply voltage that is higher than the reference voltage based on the first power supply voltage and the reference voltage, wherein the second starting circuit is configured to raise the first power supply voltage and the second power supply voltage after the second delay time period elapses from the rise of the input voltage.

13. The power supply circuit according to claim 12, wherein a delay time period that is different from the predetermined delay period and is longer than the second delay time period with respect to the rise of the input voltage is given as a third delay time period, and wherein the second starting circuit is configured to raise the first power supply voltage within a time period from an end of the second delay time period to an end of the third delay time period, and raise the second power supply voltage after the third delay time period elapses.

14. A starting method for a power supply circuit including a reference voltage generation circuit configured to generate a reference voltage that is lower than an input voltage, and a first regulator configured to generate a first power supply voltage that is higher than the reference voltage based on the input voltage and the reference voltage, the starting method comprising:

causing the reference voltage to start to rise upon expiration of a predetermined delay period from a start of a rise of the input voltage; and raising the first power supply voltage after the reference voltage rises.

* * * * *